May 26, 1959 A. F. PÉREZ 2,887,891
MULTI-UNIT DRIVE PULLEY
Filed Jan. 18, 1957 2 Sheets-Sheet 1
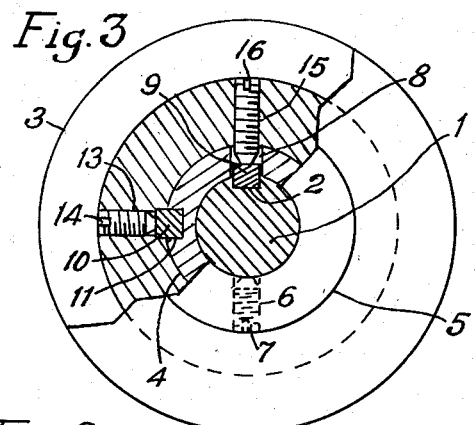
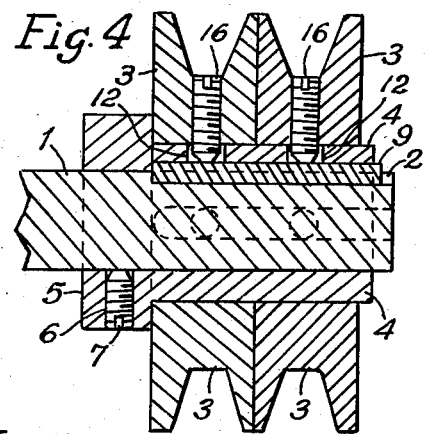
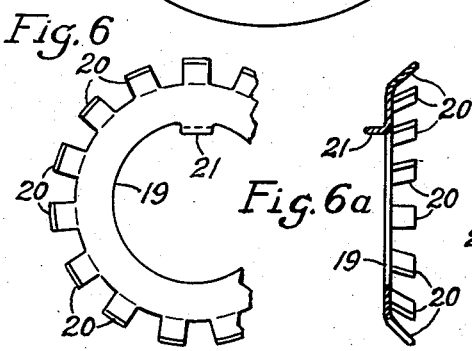
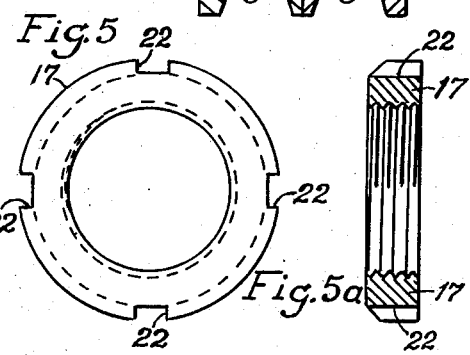
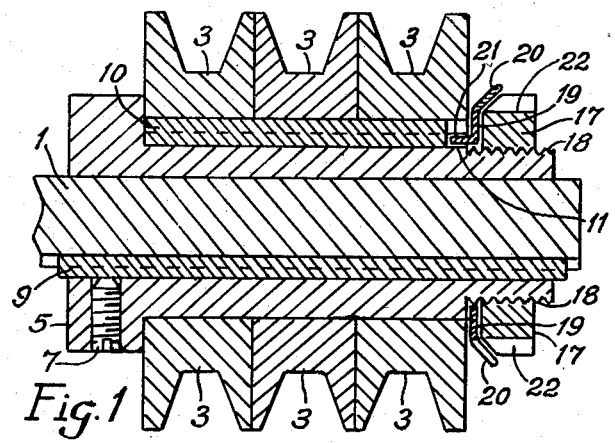
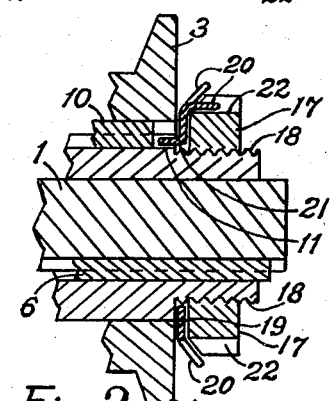
INVENTOR:
Alicia Fernández Pérez,
BY Singer, Stern & Carlburg
ATTORNEYS.

May 26, 1959
A. F. PÉREZ
2,887,891
MULTI-UNIT DRIVE PULLEY
Filed Jan. 18, 1957
2 Sheets-Sheet 2
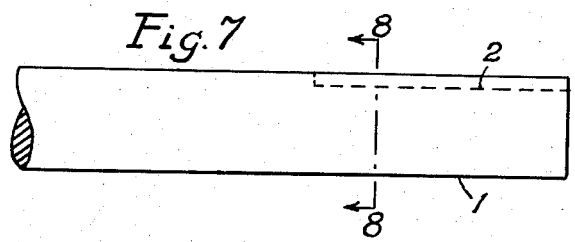
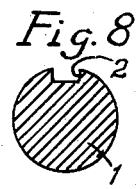
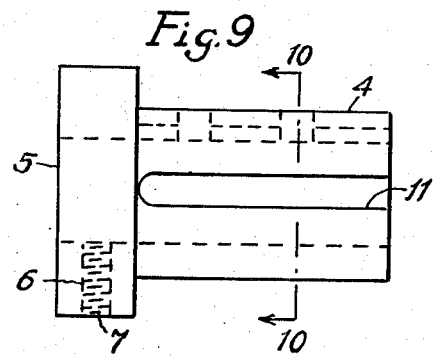
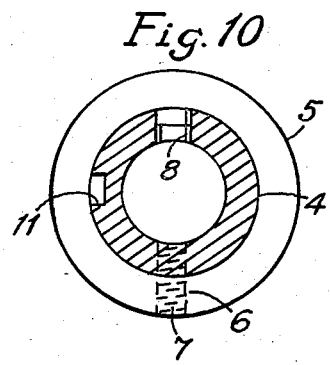
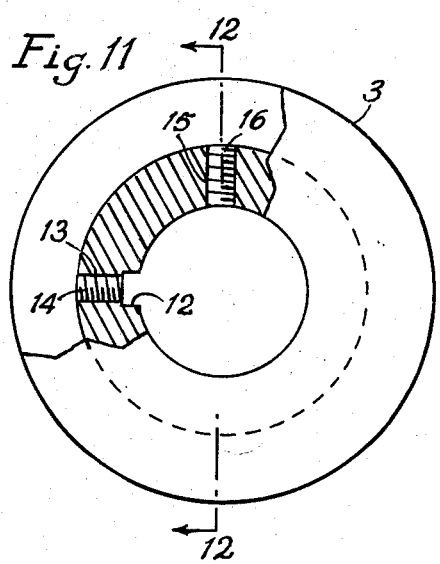
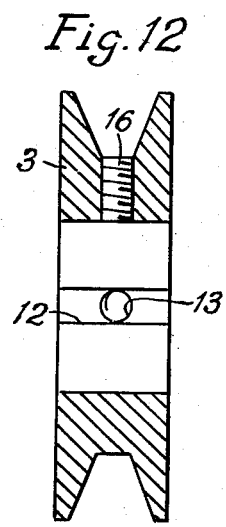
INVENTOR:
Alicia Fernández Pérez,
BY Singer, Stern & Carlburg,
ATTORNEYS.

United States Patent Office 2,887,891
Patented May 26, 1959

2,887,891
MULTI-UNIT DRIVE PULLEY

Alicia Fernandez Pérez, Havana, Cuba

Application January 18, 1957, Serial No. 634,961

2 Claims. (Cl. 74—230.3)

This invention relates to multi-unit drive pulleys, and it has for its object to provide a pulley of that kind which instead of being made as a single turned cast block it detachably comprises on a same bushing a plurality of juxtaposed sheaves whereby a bushing comprising a varying number of juxtaposed sheaves may be fitted on a same shaft, whereupon a considerable economy in manufacturing cost and a significant convenience in assemblage may be obtained in fitting a varying number of individual sheaves on a drive shaft.

Another object of this invention is to provide a lock nut to prevent the loosening of the individual sheaves on the bushing keyed to the drive shaft, by means of a washer in the shape of a metal ring provided with a crown having oblique teeth relatively to the ring plane and the washer being positioned between the nut and the latter pulley, said ring having a tongue bent in axial alignment with the sheave locking key and which is inserted into a hollow provided by the key at the end of the keyway to thereby prevent the rotation of the ring, and once the latter is placed in position, one of the teeth thereof is bent upon one of four axial recesses diametrally opposed in pairs at the nut periphery, to thereby effectively prevent the nut from loosening.

The invention is described with reference to the figures of the accompanying drawings, of which:

Fig. 1 is a diametral sectional view of the multi-unit pulley of this invention, as mounted on a shaft through a bushing.

Fig. 2 is a diametral sectional view of the end sheave of a grouping of individual sheaves.

Fig. 3 is a partly broken away side view of an individual sheave as mounted on a bushing keyed to the shaft.

Fig. 4 is a diametral longitudinal sectional view of a pair of individual sheaves mounted on the same shaft.

Fig. 5 comprises a side view of the lock nut.

Figure 5a is a diametral sectional view of the locking nut.

Fig. 6 comprises a side view of the toothed ring interposed between the nut and the end individual sheave.

Figure 6a is a dimetral sectional view of the toothed locking ring interposed between the nut and the endmost individual sheave.

Fig. 7 is a longitudinal outer view of the drive shaft.

Fig. 8 is a diametral sectional view of the same shaft on line 8—8 of Fig. 7.

Fig. 9 is a longitudinal outer view of the bushing.

Fig. 10 is a diametral sectional view of the bushing on line 10—10 of Fig. 9.

Fig. 11 is a partly broken away side view of a sheave.

Fig. 12 is a diametral sectional view of the same sheave on line 12—12 of Fig. 11.

In the drawings, 1 indicates a drive shaft having lengthwise thereof a keyway 2 adapted to receive thereon a plurality of, say, three individual sheaves 3. The sheaves 3 are juxtaposed on the shaft 1 through a bushing 4 provided with a head 5 having therein an interiorly threaded radial hole adapted to threadedly receive therein a screw 7 serving to set it on the shaft 1. The bushing 4 has an inner keyway extending throughout the inner periphery of the bushing and serving to receive a key 9 inserted in the keyway 2 of shaft 1, and an outer keyway 11 extending to the outer face of the end sheave and serving to receive the key 10 not reaching the outer face of the end sheave 3 and which brings the various individual sheaves together, to which end each sheave has a keyway 12 and all of which keys are placed in longitudinal alignment on a same key 9, as it is shown in Fig. 4 of the drawings. Further, the grooved portion of each sheave has a radial hole provided with a thread 13 into which a screw 14 is screwed to tighten the key 10, and another radial hole provided with a thread 15 at a 90° angle with the former hole 13 and into which a screw 16 is screwed to friction the key 9 securing the bushing 4 to the shaft 1.

In this manner a firm though detachable connection of the individual sheaves to the bushing 4 and shaft is attained.

The bushing 4 should be sufficiently long according to the number of individual sheaves to be carried by it, and should it be desired to change the number of sheaves, it will suffice to change the bushing 4 and the omitted sheaves may be used in a different group of sheaves for another drive shaft, which will allow a very remarkable economy in manufacturing cost and a convenient assemblage of this multi-unit pulley.

The sheaves assemblage, independently of the set screws, is secured on the bushing 4 by means of a lock nut 17 screwed on a threaded end portion 18 of the bushing in conjunction with a washer in the shape of a metal ring 19 which is provided with a crown having outer oblique teeth 20 and which is positioned on the bushing 4 between the nut 17 and the end sheave 3, said ring being provided with a tongue 21 perpendicularly bent upon said ring and being adapted to be received within the keyway 11 at the hollow end portion allowed by the key 10. In this manner, once the ring 19 and the nut are placed in position, one of the ring teeth 20 is bent into one of the four recesses 22 diametrally opposed in pairs at the periphery of the nut 17, as it is seen in Fig. 2 of the drawings. Thus, there will be no possibility of loosening of the grouped sheaves 3 mounted on the bushing 4.

It is obvious that changes may be made in the connection between the individual sheaves and the bushing and the shaft, without thereby altering the essential character of the invention which is such as claimed hereinafter.

What I claim:
1. A drive pulley comprising a plurality of individual sheaves closely juxtaposed to one another, in combination with a bushing having an inner groove for insertion therein of a key inserted in a corresponding groove of a shaft and having another outer groove for insertion therein of a key inserted in inner grooves of the individual sheaves but not reaching the end of said outer groove, and means for safely securing the grouping of individual sheaves on the bushing, said means consisting of a nut screwed on an end threaded portion of the bushing, and said nut having four peripheral recesses diametrally opposed in pairs at its periphery, and a metal ring provided with peripheral teeth oblique to the ring plane and a tongue perpendicularly bent upon its inner edge and adapted to be received within the end hollow allowed by the key inserted into the outer groove, the ring being so mounted on the bushing between the nut and the end sheave that one of the teeth thereof may be bent and inserted into one of the peripheral recesses of the nut.

2. In a drive pulley adapted to be secured to a drive shaft having a keyway, a bushing having a corresponding keyway adapted to be received on said shaft, a key mounted in the keyways of said shaft and bushing, a threaded locking member extending through said bushing arranged to engage said key and retain said bushing on said shaft, an annular flange on one end of said bushing, the other end of said bushing being provided with a series of screw threads, a series of pulley sheaves mounted on said bushing, keyways in said pulley sheaves and bushing, a key received in said keyways, a lock washer on the threaded end of said bushing having a projection adapted to enter the keyway in said bushing and having a series of circumferentially arranged locking teeth, and a nut correspondingly threaded for being received on the threaded end of said bushing and urging said pulley sheaves into close contactual engagement one with the other, the teeth on said washer being adapted to be bent to lockingly engage within certain notches in said nut.

References Cited in the file of this patent

UNITED STATES PATENTS

| | | |
|---|---|---|
| 2,010,451 | Browning | Aug. 6, 1935 |
| 2,341,272 | Firth et al. | Feb. 8, 1944 |
| 2,427,172 | Williams | Sept. 9, 1947 |
| 2,564,335 | Lake | Aug. 14, 1951 |